Feb. 10, 1959     E. JONSSON     2,873,110
TORSION SPRING
Filed Oct. 25, 1954
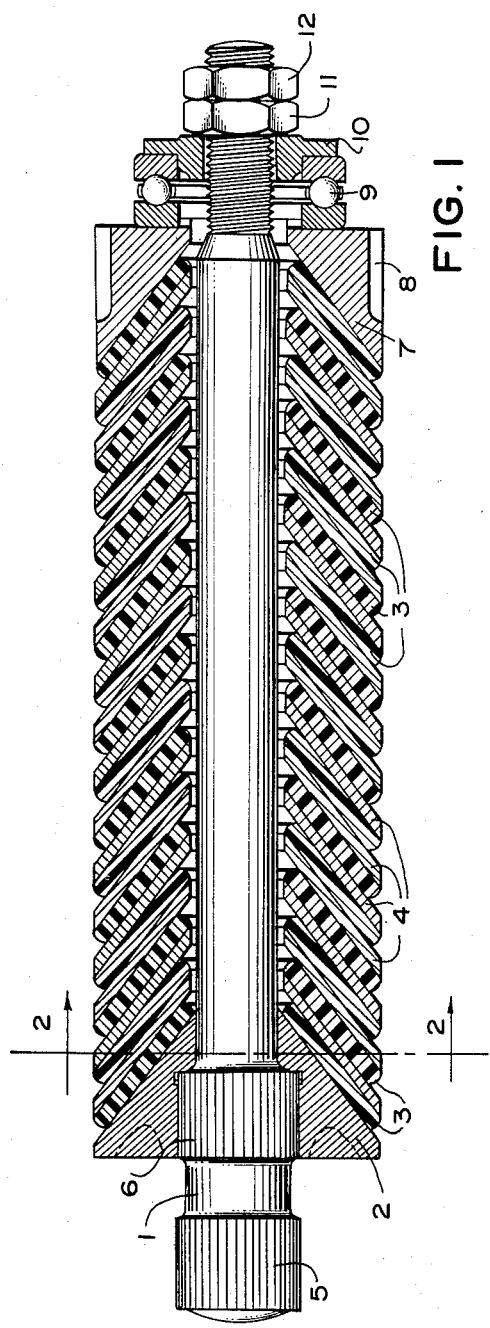
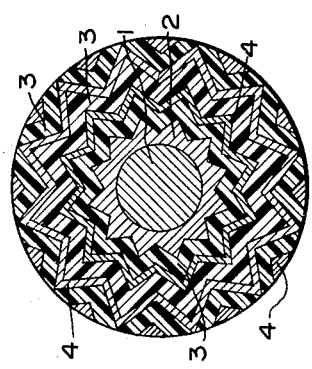
INVENTOR
EINAR JONSSON
BY *Gustav H. Emery*
ATTORNEY

2,873,110

TORSION SPRING

Einar Jonsson, New York, N. Y.

Application October 25, 1954, Serial No. 464,357

7 Claims. (Cl. 267—57.1)

This invention relates to a torsion spring.

It is an object of the invention to provide a torsion spring with alternating rubber and steel rings or collars each corrugated and interfitting. A further object is to provide the spring with the rubber and steel collars or rings of frusto-conical configuration so that the spring action is produced by compression of the rubber collars. Another object of the invention is to mount the alternating steel and rubber collars on a metallic rod or axle with end collars to which are relatively rotatable to transmit the torsional forces created by the rubber collars.

Further objects will be apparent from the following description when considered in connection with the accompanying drawing in which:

Figure 1 is a longitudinal sectional view of the spring,

Fig. 2 is a cross section taken on line 2—2 of Fig. 1, and

Fig. 3 is a perspective view of a steel collar.

A shaft or axle 1 is provided with two splined sections 5 and 6 at the left end thereof, Fig. 1, and with a ball bearing 9, a support ring 10 and two nuts 11 and 12 at the right end. Also the left end is provided with a rigidly mounted abutment sleeve or collar 2 and the right end is provided with a movable sleeve or collar 7 having splines or grooves 8 therein. Between the parts 2 and 7 on the rod or axle 1 there are provided alternately a plurality of rubber sleeves or collars 3 and steel sleeves or collars 4, each corrugated and having a frusto-conical shape. Also the frusto-conical faces of the parts 2 and 7 where they contact the rubber collars 3 are also corrugated or ribbed similar to the configurations of the collars 3 and 4.

Said steel and rubber cones 3 and 4 are mounted from the right fitting into each other alternately rubber and steel as shown in Fig. 1. The steel ring 7 with corrugated conical inner surface fits against a rubber cone 3 and this ring has the splines 8 on the outside. Thrust-bearing 9 is fitted on a collar on the ring 7 and on the right side, Fig. 1, rests against the support ring 11. The thrust bearing 9 should be of a sealed type and with built in lubricant. Nuts 11 and 12 are fitted on the threaded end of axle 1, and the rubber and steel cones are heavily compressed between collar 2 and ring 7 by tightening the nuts. The corrugations on the conical steel and rubber parts fit into each other, the conical shape of the parts serving to increase the contact area and furthermore to increase the compression of the rubber parts caused by the axial pressure.

When in operation the spring is secured in the right end by the splines 8 on ring 7, and the splines 5 of axle 1 fit into matching splines in the mechanism to be sprung by the spring. When twisting action is applied to the spring, said action will be transmitted through the inner splines 6 on axle 1 to collar 2 and through the sides of the corrugations on the conical surface on the collar 2 to the rubber cone 3 and so on alternately through the rubber and steel cones 3 and 4 to ring 7, which is secured against circular motion by the splines 8. Circular motion of axle 1 in relation to ring 7 is taken up by the thrust bearing 9. It is clearly shown in Fig. 2 that torque applied to the spring will be taken up by the rubber compressed between the steel parts and spring action will be achieved through the flexibility of the rubber. The amount of deformation of the rubber, when torque is applied to the system, depends on how heavily the rubber is compressed between the steel parts and that makes the rate and stiffness of the spring adjustable, which is carried out by varying the axial pressure through adjustment of the nuts 11 and 12. The amount of deformation on each rubber cone caused by twisting the spring through a certain angle clearly depends on the number of rubber cones used and in the design shown in the drawing, where 17 rubber cones are employed, a 30° twisting of the spring only causes approximately .011″ deformation of the rubber near the inner circumference of the spring and .035 deformation near the outer circumference. The outer diameter in this case is approximately 2.25″ and the inner diameter is 0.75″. This type of design can be used both as a spring and as a shock-absorbing mechanism in transmission, etc.

I claim as my invention:

1. A torsion spring comprising a rod, a plurality of corrugated frusto-conical rubber collars mounted on said rod, said corrugations running parallel with the surface of the cone relative to its longitudinal axis, and means at each end of the rod for applying stress to the collars.

2. A torsion spring comprising a rod, a plurality of corrugated frusto-conical rubber collars mounted on said rod, and means on each end of the spring to take up the twist forces created by the collars, said corrugations running parallel with the surface of the cone relative to its longitudinal axis.

3. A torsion spring comprising a rod, a plurality of corrugated frusto-conical rubber collars mounted on said rod by means of openings in the collars, and a plurality of corrugated frusto-conical steel collars mounted alternately on the rod with the rubber collars by means of openings in the steel collars, the rubber and steel collars having the same shape so that adjacent collars will interfit with each other, and means at each end of the rod for applying stress to the collars.

4. A torsion spring comprising a plurality of corrugated frusto-conical rubber collars mounted in series on an axis so that a number of the collars may be relatively rotatable to produce a twisting force, said corrugations running parallel with the surface of the cone relative to its longitudinal axis.

5. A torsion spring comprising a plurality of corrugated frusto-conical rubber and steel collars arranged adjacent to each other in alternate relationship, said corrugations running parallel with the surface of the cone relative to its longitudinal axis.

6. A torsion spring comprising a rod, a plurality of corrugated frusto-conical rubber collars mounted on said rod, means on one end of the rod to adjust the normal pressure on the rubber collars, said corrugations running parallel with the surface of the cone relative to its longitudinal axis, and means on the other end of the rod for resisting the pressure.

7. A torsion spring comprising a rod, a plurality of corrugated frusto-conical rubber collars mounted on said rod by means of openings in the collars, a plurality of corrugated frusto-conical steel collars mounted alternately on the rod with the rubber collars by means of openings in the steel collars, the rubber and steel collars having the same shape so that adjacent collars will interfit with each other, and means at each end of the rod for applying stress to the collars, the means provided on one end of the rod adjusting the normal pressure on the rubber collars, and the means on the other end of the rod resisting the pressure.

References Cited in the file of this patent

UNITED STATES PATENTS

| | | |
|---|---|---|
| 2,002,377 | Mayne | May 21, 1935 |
| 2,167,508 | Herold | July 25, 1939 |
| 2,523,504 | Ford | Sept. 26, 1950 |

FOREIGN PATENTS

| | | |
|---|---|---|
| 418,390 | Great Britain | Oct. 24, 1934 |